(12) United States Patent
Newton et al.

(10) Patent No.: US 9,007,434 B2
(45) Date of Patent: Apr. 14, 2015

(54) ENTRY POINTS FOR 3D TRICKPLAY

(76) Inventors: Philip Steven Newton, Eindhoven (NL);
Francesco Scalori, Capolago (CH)

(*) Notice: Subject to any disclaimer, the term of this patent is extended or adjusted under 35 U.S.C. 154(b) by 1163 days.

(21) Appl. No.: 12/781,494

(22) Filed: May 17, 2010

(65) Prior Publication Data

US 2010/0289875 A1  Nov. 18, 2010

(30) Foreign Application Priority Data

May 18, 2009  (EP) .................................... 09160453

(51) Int. Cl.
| | | |
|---|---|---|
| H04N 13/00 | (2006.01) | |
| H04N 13/04 | (2006.01) | |
| G11B 27/00 | (2006.01) | |
| G11B 27/034 | (2006.01) | |
| H04N 19/597 | (2014.01) | |

(52) U.S. Cl.
CPC ....... *H04N 13/0454* (2013.01); *H04N 13/0055* (2013.01); *H04N 13/0066* (2013.01); *G11B 27/005* (2013.01); *G11B 27/034* (2013.01); *H04N 19/597* (2013.01)

(58) Field of Classification Search
CPC ............ H04N 19/597; H04N 13/0454; H04N 13/0066; H04N 13/0055; H04N 2213/001; H04N 2213/006; H04N 2213/007; H04N 2213/008; H04N 2213/009; G11B 27/034; G11B 27/005
USPC .......................................................... 348/43
See application file for complete search history.

(56) References Cited

U.S. PATENT DOCUMENTS

| | | | |
|---|---|---|---|
| 6,064,794 A | 5/2000 | McLaren | |
| 6,574,423 B1 | 6/2003 | Oshima | |
| 8,045,588 B2 * | 10/2011 | Lee et al. ....................... | 370/475 |
| 8,121,461 B2 * | 2/2012 | Ikeda et al. ................... | 386/248 |
| 8,259,162 B2 * | 9/2012 | Kim et al. ....................... | 348/51 |
| 8,275,234 B2 * | 9/2012 | McCrossan et al. .......... | 386/217 |
| 2006/0117357 A1 | 6/2006 | Surline | |

(Continued)

FOREIGN PATENT DOCUMENTS

| | | |
|---|---|---|
| WO | 2008038205 A2 | 4/2008 |
| WO | 2008044191 A2 | 4/2008 |
| WO | 2008103748 A2 | 8/2008 |

OTHER PUBLICATIONS

Li, Guoping et al "A Novel Multi-View Video Coding Scheme Based on H.264" ICICS-PCM 2003, Dec. 2003, pp. 493-497.
Merkle, Philipp et al Efficient Prediction Structures for Multi-View Video Coding, IEEE 2007, pp. 1-14.

(Continued)

*Primary Examiner* — Tung Vo

(57) ABSTRACT

Providing entry points for 3D video data is described; an entry point unit (18) generates an entry point table by defining entry points in an incoming 3D video data stream and storing entry point addresses giving the location of the defined entry points; the video data stream comprises a multitude of sub-streams, which multitude encodes one stream of 3D 5 video data and comprises at least one 2D sub-stream that independently encodes a 2D version of the 3D video data and at least one auxiliary sub-stream that dependently encodes part of the 3D video data; the entry points include main entry points in the 2D sub-stream and auxiliary entry points in the auxiliary sub-stream for enabling 3D trickplay of the 3D video data by retrieving and decoding non-adjacent fragments of the 2D sub-stream and retrieving 10 and dependently decoding corresponding fragments of the auxiliary sub-stream.

17 Claims, 5 Drawing Sheets

(56) References Cited

U.S. PATENT DOCUMENTS

| | | | |
|---|---|---|---|
| 2007/0002041 A1* | 1/2007 | Kim et al. | 345/419 |
| 2008/0240230 A1* | 10/2008 | Oxman et al. | 375/240.01 |
| 2009/0116818 A1 | 5/2009 | Sasaki | |
| 2009/0142041 A1* | 6/2009 | Nagasawa et al. | 386/124 |
| 2011/0075989 A1* | 3/2011 | Hattori | 386/240 |
| 2011/0242278 A1* | 10/2011 | Yang et al. | 348/43 |
| 2011/0255592 A1* | 10/2011 | Sung et al. | 375/240.02 |
| 2012/0007948 A1* | 1/2012 | Suh et al. | 348/43 |
| 2012/0056981 A1* | 3/2012 | Tian et al. | 348/42 |

OTHER PUBLICATIONS

Fehn, Christoph Depth-Image-Based Rendering (DIBR), Compression and Transmission for a New Approach on 3D-TV, Berlin, Germany, 2004.

Chang, Po-Rong et al "Design of Multicode CDMA Systems for 3-D Stereoscopic Video over Wireless ATM Networks" IEEE Transactions on Vehicular Technology, vol. 49, No. 2, Mar. 2000, pp. 334-356.

Muller, Karsten et al "Compressing Time-Varying Visual Content", IEEE Signal Processing Magazine, IEEE Service Center, vol. 24, No. 6, Nov. 2007, pp. 58-65.

* cited by examiner

| CPI_type | Meaning |
|---|---|
| 0 | reserved |
| 1 | EP_map type |
| 2 | reserved |
| 3 - 15 | reserved |

| CPI_type | Meaning |
|---|---|
| 0 | reserved |
| 1 | EP_map type |
| 2 | EP_map_MVC |
| 3 - 15 | reserved |

| EP_stream_type | Meaning |
|---|---|
| 0 | reserved |
| 1 | Video type 1 |
| 2 | reserved |
| 3 | audio |
| 4 -7 | reserved |
| 8 | MVC_stream_type |

| Syntax | No. of bits | Mnemonic |
|---|---|---|
| EP_map(){ | | |
|   reserved_for_word_align | 8 | bslbf |
|   Number_of_stream_PID_entries | 8 | uimsbf |
|   for (k=0; k<number_of_stream_PID_entries; k++) { | | |
|     stream_PID [k] | 16 | bslbf |
|     reserved_for_word_align | 10 | bslbf |
|     EP_stream_type [k] | 4 | bslbf |
|     number_of_EP_coarse_entries [k] | 16 | uimsbf |
|     number_of_EP_fine_entries [k] | 18 | uimsbf |
|     EP_map_for_one_stream_PID_start_address [k] | 32 | uimsbf |
|   } | | |
|   for (i=0; i<X; i++) { | | |
|     padding_word | 16 | bslbf |
|   } | | |
|   for (k=0; k<number_of_stream_PID_entries; K++) { | | |
|     EP_map_for_one_stream_PID(EP_stream_type[k], | | |
|       number_of_EP_coarse_entries[k], | | |
|       number_of_EP_fine_entries[k]) | | |
|     for (i=0; i<Y[k]; i++) { | | |
|       padding_word | 16 | bslbf |
|     } | | |
|   } | | |
| } | | |

FIG. 10

| Syntax | No. of bits | Mnemonic |
|---|---|---|
| EP_map_for_one_stream_PID(EP_stream_type, Nc,Nf) { | | |
|   EP_fine_table_strart_address | 32 | uimsbf |
|   for (i=0; i<Nc; i++) { | | |
|     Ref_to_EP_fine_id*[i]* | 18 | uimsbf |
|     PTS_EP_coarse*[i]* | 14 | uimsbf |
|     SPN_EP_coarse*[i]* | 32 | uimsbf |
|     MVC_ENTRY { | | |
|       TEMPORAL_VECTOR[i]{ | | |
|         PTS_EP_coarse*[i]* | | |
|         SPN_EP_coarse*[i]* | | |
|       SPATIAL_VECTOR[i]{ | | |
|         PTS_EP_coarse*[i]* | | |
|         SPN_EP_coarse*[i]* | | |
|     } | | |
|   } | | |
|   for (i=0; i<X; i++) { | | |
|     Padding_word | 16 | bslbf |
|   } | | |
|   for (EP_fine_id = 0; | | |
|       EP_fine_id < Nf; | | |
|       EP_fine_id ++) { | | |
|     is_angle_change_piont*[EP_fine_id]* | 1 | bslbf |
|     I_end_position_offset*[EP_fine_id]* | 3 | bslbf |
|     PTS_EP_fine*[EP_fine_id]* | 11 | uimsbf |
|     SPN_EP_fine*[EP_fine_id]* | 17 | uimsbf |
|     MVC_ENTRY { | | |
|       TEMPORAL_VECTOR[i]{ | | |
|         PTS_EP_fine*[EP_fine_id]* | | |
|         SPN_EP_fine*[EP_fine_id]* | | |
|       SPATIAL_VECTOR[i]{ | | |
|         PTS_EP_fine*[EP_fine_id]* | | |
|         SPN_EP_fine*[EP_fine_id]* | | |
|     } | | |
| } | | |

ENTRY POINTS FOR 3D TRICKPLAY

FIELD OF THE INVENTION

The invention relates to a method of providing entry points for a video data stream, the method comprising, generating an entry point table;

defining entry points in the video data stream, in which the entry points are defined at a distance in time from each other;

storing the defined entry points in the entry point table by storing entry point addresses giving the location of the defined entry points.

The invention further relates to a device for providing entry points, a device for reproducing video data, a signal, a method of rendering and a computer program product.

The invention relates to the field of rendering 3D video data in trickplay mode, i.e. reproducing the 3D video with increased speed in forward or backward direction on a 3D display device.

BACKGROUND OF THE INVENTION

Devices for rendering 2D video data are known, for example video players like DVD players or set top boxes which provide digital video signals. The source device is to be coupled to a display device like a TV set or monitor. Image data is transferred from the source device via a suitable interface, preferably a high-speed digital interface like HDMI. Currently 3D enhanced devices for sourcing three dimensional (3D) image data are being proposed.

For 3D content, such as 3D movies or TV programs, additional control data for enabling trickplay may be provided in combination with the image data, for example a list of pointers to subsequent locations of frames that can be rendered at increased speed. Trickplay is any rendering mode of the 3D video content at a speed different from the original speed, such as fast forward or fast backward, or slow motion, in various speeds.

The document US 2006/0117357 describes a system for rendering 2D video data in trickplay modes. A digital video signal is reproduced at various trick mode playback speeds. Frame indices associated with video frames of a digital video stream are monitored and a Group-of-Pictures (GOP) size is determined from the frame indices. One or more trick mode play speed parameters are calculated based on the determined GOP size. Presentation of the video frames is controlled based on the calculated trick mode play speed parameters. In one embodiment, the trick mode play speed parameters include a frame-skip count and a frame-repeat count.

For 3D content trickplay has to be developed also. One example of 3D content is a two-dimensional image and an associated depth map. Another example of 3D content is a plurality of two-dimensional images, e.g. the well known stereoscopic content having a right eye image and a left eye image. Yet another example of 3D content is stereoscopic content having a plurality of right eye images and left eye images, to be displayed on a multi-view display.

SUMMARY OF THE INVENTION

A problem of trickplay with 3D video is that the burden on the video decoder increases as the decoder has to decode more frames in shorter time (for smooth trickplay). With stereoscopic video the decoder has to decode two or more streams and this increases burden as compared to 2D. In addition if the multiview video is encoded using dependent sub-stream multiview coding then decoding of the additional streams becomes dependent on the base view stream.

To provide 2D trickplay the Blu-ray Disc standard specifies an Entry Point table (EP-map) for every elementary video stream. The video is encoded in frames of various types as defined in the well-known MPEG standards. The table lists the location in the stream of points where decoding may start. Usually the entry points are at MPEG I frame boundaries. The table only lists the entry points for one stream, no account has been taken of the fact that several video streams may be decoded simultaneously that are also dependent on each other.

It is an object of the invention to provide a system for 3D trickplay in a more convenient way.

For this purpose, according to a first aspect of the invention, in the method as described in the opening paragraph, the video data stream comprises a multitude of sub-streams, which multitude encodes one stream of 3D video data and comprises at least one 2D sub-stream that independently encodes a 2D version of the 3D video data and at least one auxiliary sub-stream that dependently encodes part of the 3D video data; defining the entry points comprises defining main entry points in the 2D sub-stream and auxiliary entry points in the auxiliary sub-stream for enabling 3D trickplay of the 3D video data by retrieving and decoding non-adjacent fragments of the 2D sub-stream and retrieving and dependently decoding corresponding fragments of the auxiliary sub-stream.

For this purpose, according to a second aspect of the invention, the device for providing entry points for a video data stream comprises means for generating an entry point table by defining entry points in the video data stream, in which the entry points are defined at a distance in time from each other, and storing the defined entry points in the entry point table by storing entry point addresses giving the location of the defined entry points, wherein the video data stream comprises a multitude of sub-streams, which multitude encodes one stream of 3D video data and comprises at least one 2D sub-stream that independently encodes a 2D version of the 3D video data and at least one auxiliary sub-stream that dependently encodes part of the 3D video data, and the means for generating an entry point table are arranged for defining main entry points in the 2D sub-stream and auxiliary entry points in the auxiliary sub-stream for enabling 3D trickplay of the 3D video data by retrieving and decoding non-adjacent fragments of the 2D sub-stream and retrieving and dependently decoding corresponding fragments of the auxiliary sub-stream.

For this purpose, according to a further aspect of the invention, the device for reproducing video data, comprises means for receiving a video data stream and an entry point table as defined above, wherein the video data stream comprises a multitude of sub-streams, which multitude encodes one stream of 3D video data and comprises at least one 2D sub-stream that independently encodes a 2D version of the 3D video data and at least one auxiliary sub-stream that dependently encodes part of the 3D video data, and the entry points comprise main entry points in the 2D sub-stream and auxiliary entry points in the auxiliary sub-stream; and the device comprises means for 3D trickplay of the 3D video data by reproducing the 3D video data by, according to the entry point table, retrieving and decoding non-adjacent fragments of the 2D sub-stream and retrieving and dependently decoding corresponding fragments of the auxiliary sub-stream.

For this purpose, according to a further aspect of the invention, the signal that conveys video data comprises a video data stream having entry points defined at a distance in time from each other, and an entry point table as defined above comprising the defined entry points by stored entry point addresses giving the location of the defined entry points, wherein the video data stream comprises a multitude of sub-streams, which multitude encodes one stream of 3D video data and comprises at least one 2D sub-stream that independently encodes a 2D version of the 3D video data and at least one auxiliary sub-stream that dependently encodes part of the 3D video data; and the entry point table comprises main entry points in the 2D sub-stream and auxiliary entry points in the auxiliary sub-stream for enabling 3D trickplay of the 3D video data by retrieving and decoding non-adjacent fragments of the 2D sub-stream and retrieving and dependently decoding corresponding fragments of the auxiliary sub-stream.

For this purpose, according to a further aspect of the invention, the method of rendering video data on the basis of the signal as defined above comprises receiving a video data stream and an entry point table as defined above, wherein the video data stream comprises a multitude of sub-streams, which multitude encodes one stream of 3D video data and comprises at least one 2D sub-stream that independently encodes a 2D version of the 3D video data and at least one auxiliary sub-stream that dependently encodes part of the 3D video data, the entry points comprise main entry points in the 2D sub-stream and auxiliary entry points in the auxiliary sub-stream; and the method comprises rendering 3D trickplay of the 3D video data by reproducing the 3D video data by, according to the entry point table, retrieving and decoding non-adjacent fragments of the 2D sub-stream and retrieving and dependently decoding corresponding fragments of the auxiliary sub-stream.

The measures have the effect that trickplay of multiple substream encoded 3D video data, e.g. multiview encoded video for Blu-ray Disc, now is provided with an extended entry point table. The traditional entry point table provides a single entry point for a particular instant in a video stream. The entry point table according to the invention provides at least one further entry point for a particular instant that has a main entry point for also directly accessing the corresponding auxiliary video stream. For example this is achieved by changing the definition of the entry point table such that the EP map related to the base view video stream also contains the entry points for the associated auxiliary streams, which by themselves cannot be decoded. When decoding of a particular fragment of 3D video to be reproduced in trickplay mode the necessary data of the main stream and the auxiliary stream can be directly accessed. Advantageously a viewer will not have to experience disturbing effects in the depth perception when not all sub-streams are properly decoded or available due to missing references.

The invention is also based on the following recognition. The prior art 2D trickplay system is not aware of the problems for 3D trickplay. In particular, for a single video stream a single set of entry points is provided. However, in addition to a main substream that is independently decodable, one or more auxiliary sub-streams are present in a 3D video signal. The inventors have seen that such sub-streams, which at normal reproduction speed, are only decodable in dependence of the main stream. Hence, traditionally, such auxiliary streams would not have entry points, because entry points in any non-decodable stream appear to be without any merit. Nevertheless the inventors have added entry point to the non-decodable auxiliary stream. Only by providing both the main and auxiliary entry point addresses both streams can be conveniently decoded in non adjacent fragments for trickplay, because for such a fragment the corresponding fragment of the auxiliary stream can immediately be retrieved according to the enhanced entry point table.

In an embodiment of the system the video data stream comprises multi-view 3D video data, which multi-view includes at least one left view and one right view. Multiview 3D video provides multiple separate views for the left and right eye. The multiple views of the 3D scene have large overlap, and are usually dependently encoded, as explained for example in reference [1] or [2]. The enhanced entry point table conveniently provides trickplay for such multiview 3D video streams.

In an embodiment of the system the video data stream comprises multiple auxiliary sub-streams and the entry points comprise auxiliary entry points only for a selected subset of said multiple auxiliary sub-streams for rendering a reduced version of the 3D video data during trickplay. Advantageously the size of the entry point table remains limited. The embodiment is also based on the recognition that, during trickplay, some degradation of the 3D video rendered is acceptable. For example, the number of views of multiview 3D video may be reduced by not decoding every sub-stream, or transparency data may be ignored in a structured 3D video format.

Further preferred embodiments of the method, 3D devices and signal according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which
FIG. 10 shows a definition of an entry point map,
and
FIG. 11 shows an entry point table for a combined main stream and a sub-stream.

In the Figures, elements which correspond to elements already described have the same reference numerals.

DETAILED DESCRIPTION OF EMBODIMENTS

Figure 1:
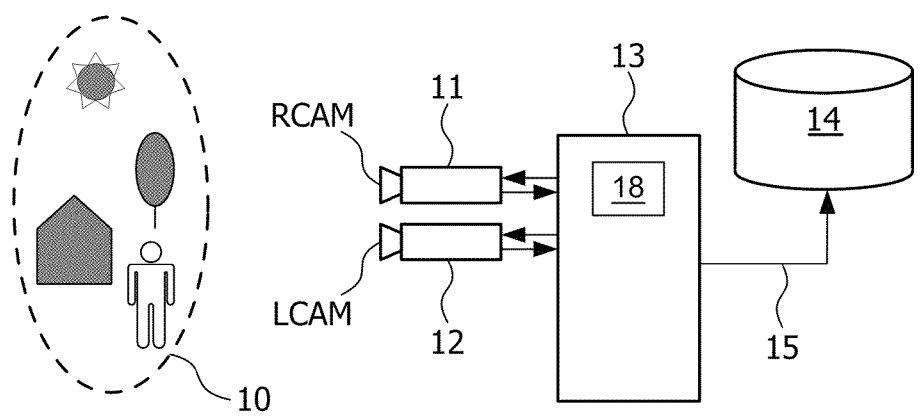
FIG. 1 shows a 3-D video generation system.

FIG. 1 shows a 3-D video generation system. The 3-D video generation system comprises a pair of cameras, a right camera 11 and a left camera 12, a 3D video processor 13 which generates a video signal 15 to be stored on a storage medium 14. The right camera and the left camera may each be a conventional camera. A depth scanner may be associated with the left camera, comprising, for example, a laser beam that can be steered in various directions, and a sensor that detects reflections of the laser beam. Depth information may also be generated by computation from the camera information. The pair of cameras is directed towards a scene 10 as to capture a 3-D video of the scene. The scene 10 comprises various objects, such as, for example, a person, a tree, a house, and the sun in the sky. Each object has a given distance with respect to the pair of cameras, which may be regarded as a virtual observer watching the scene.

The 3D video processor may comprise, for example, an instruction-executing device and a program memory into which a set of instructions has been loaded that define operations of the 3D video processor, which will be described hereinafter. The storage medium 14 may be in the form of, for example, a hard disk, a writable optical disk, a mastering system for manufacturing read-only type optical discs or a solid-state memory.

The 3-D video generation system basically operates as follows. The pair of cameras provides a basic 3-D video of the scene, which is formed by a sequence of picture pairs. A picture pair comprises a right picture and a left picture. The right picture, which is captured by the right camera, is intended for the right eye of a human observer. The left picture, which is captured by the left camera, is intended for the left eye of a human observer.

The right camera and the left camera have a particular positional relationship with respect to each other. This positional relationship may be defined by a typical rendering context in terms of, for example, screen size and a viewing distance. For example, the basic 3-D video, which comprises a sequence of right pictures and a sequence of left pictures that are interrelated, may be intended for display in a cinema with a typical screen size of 12 meters and a typical viewing distance of 18 meters. A multiview 3D video data stream may be generated from the camera and/or depth information. Multiview 3D video provides multiple separate views for the left and right eye. The multiple views of the 3D scene have large overlap, and are usually dependently encoded, as explained for example in reference [1] of [2].

A different 3D format is based on two views using a 2D image and an additional depth image, a so called depth map, which conveys information about the depth of objects in the 2D image. The format called image+depth is different in that it is a combination of a 2D image with a so called "depth", or disparity map. This is a gray scale image, whereby the gray scale value of a pixel indicates the amount of disparity (or depth in case of a depth map) for the corresponding pixel in the associated 2D image. The display device uses the disparity, depth or parallax map to calculate the additional views taking the 2D image as input. This may be done in a variety of ways, in the simplest form it is a matter of shifting pixels to the left or right dependent on the disparity value associated to those pixels. Reference [3] gives an excellent overview of the technology.

In the system shown in FIG. 1 the 3D video processor 13 has an entry point unit 18 for processing the incoming 3D video data and generate an entry point table for 3D trickplay mode. The entry point unit is arranged for defining entry points in the video data stream. The entry points are stored in the entry point table. The entry points are defined in the video data stream at a distance in time from each other. Subsequently the defined entry points are stored in the entry point table, e.g. by storing entry point addresses giving the location of the defined entry points. In 3D video data stream formats the video data stream usually comprises a multitude of substreams, which multitude encodes one stream of 3D video data and comprises at least one 2D sub-stream that independently encodes a 2D version of the 3D video data and at least one auxiliary sub-stream that dependently encodes part of the 3D video data. For example, the part may be a right view (depending on an independently encoded left view stream), or a depth map. For such a 3D video stream the entry points are generated to comprise main entry points in the 2D sub-stream and auxiliary entry points in the auxiliary sub-stream for enabling 3D trickplay of the 3D video data.

During rendering, selected fragments of the main (2D) sub-stream are retrieved based on the main entry points and decoded as non-adjacent fragments of the 2D sub-stream. Subsequently parts of the auxiliary, dependent sub-stream, which correspond to the selected p[arts of the 2D substream, are retrieved based on the auxiliary entry points and dependently decoded as fragments of the auxiliary sub-stream.

Figure 2:
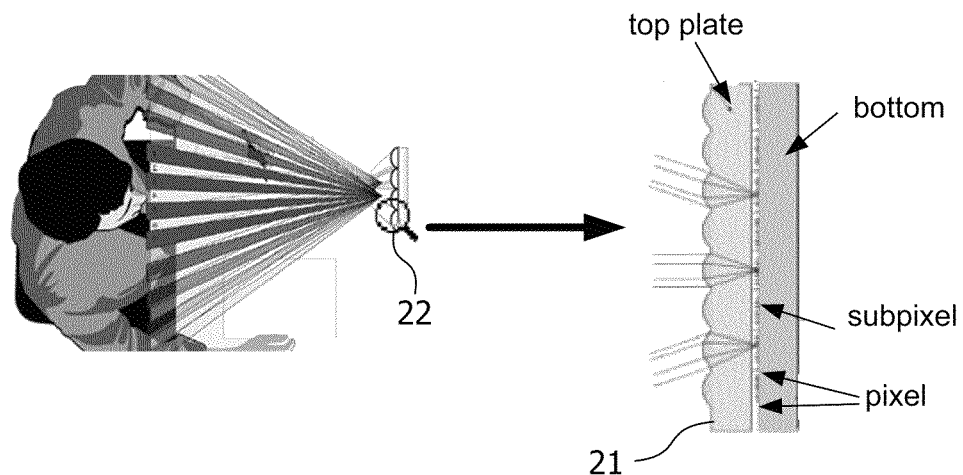
FIG. 2 shows a multiview display.

FIG. 2 shows a multiview display 21, which uses lenticular lenses 22 in front of a LCD screen to generate a different view for the left and right eye. Interleaving two images shot from a slightly different angle creates the 3D perception. This effect is based on binocular disparity, the left and right eye normally see an object from a slightly different angle. These are fused together through accommodation and convergence and this acts as a powerful depth cue for the brain.

Figure 3:
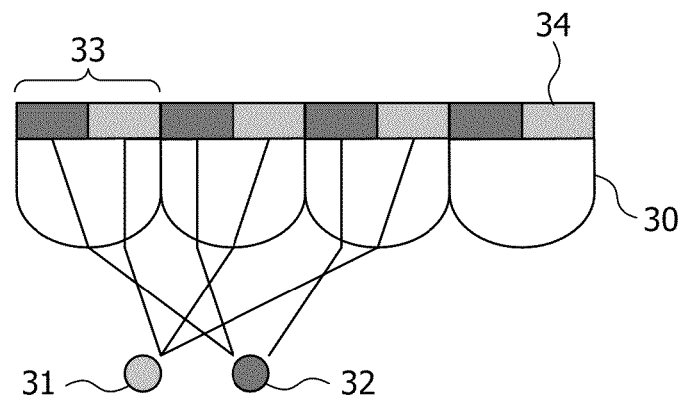
FIG. 3 shows right and left eye view via lenticular lenses.

FIG. 3 shows right and left eye view via lenticular lenses 30. The right eye 32 only sees the left part of the pixel 33 and the left eye 31 sees the right part. The pixel parts are called sub-pixels 34. Fusion of the right- and left part of an image in the human viewer through accommodation and convergence creates a depth cue by presenting a single stereoscopic image. Multiple left and right views can be created by subdividing each pixel in multiple sub-pixels.

For example, in contrast to FIG. 3 where only two interleaved images are shown, a practical display may use, for example, 9 interleaved images, which gives a wider range of view and contour to the image, as schematically indicated in FIG. 2. To drive such a type of display requires either image-plus-depth based video which is processed to generate multiple views, or multiview encoded video. To this end the Blu-ray Disc standard may be extended to include support for such 3D video streams. A player may then drive not only autostereoscopic displays, but also other types of stereo 3D displays such as a display that alternates views and that uses shutterglasses to separate the views for both eyes individually, or in the future may even include holographics displays.

An alternative to the lenticular screen is the Barrier display, which uses a parallax barrier behind the LCD and in front the backlight to separate the light from pixels in the LCD. The barrier is such that from a set position in front of the screen, the left eye sees different pixels then the right eye. The barrier may also be between the LCD and the human viewer so that pixels in a row of the display alternately are visible by the left and right eye.

From experiments with trickplay of 3D video it has been found that the quality of the "3D depth" impression deteriorates during trickplay. A possible explanation is that stereoscopic video demands a larger and longer effort to the human optical system (accommodation and convergence) than normal 2D video, in order for the brain to fuse the two images received by the eyes into a "3D" mental image. When the number of frames shown per second increases considerably during trickplay, the human optical system appears to be unable to catch up completely with the higher frame rate.

Another problem of trickplay with stereo 3D video is that the burden on the video decoder increases as the decoder has to decode more frames in shorter time (for smooth trickplay). With stereoscopic video the decoder has to decode two or more streams and this increases the problem as compared to 2D. In addition if the multiview video is encoded using scalable multiview coding as defined by MPEG then decoding of the additional streams becomes dependent on the base view stream, therefore the way in which trickplay can be done in the player must change. Such streams, which cannot be decoded independently are called auxiliary sub-streams in this document. Such streams are to be dependently decoded based on the corresponding main stream.

In the following explanation an example of an entry point table is discussed with reference to the Blu-ray Disc system. It is noted that the entry point table can be applied to any 3D video system which is based on main and auxiliary video streams, and details of the Blu-ray disc system are not required for implementing the invention. The Blu-ray Disc standard specifies an Entry Point table (including an entry point map: EP-map) for every elementary video stream. The entry point table defines table which lists the location in the stream of points where decoding may start. Usually these are at MPEG I frame boundaries. This table only lists the entry points for one stream, no account has been taken of the fact that several video streams may be decoded simultaneously that are also dependent on each other.

It has been found that depth perception during trickplay is improved when skipping frames to create a kind of slideshow effect. Hence separate, non adjacent, fragments of the original 3D video stream are displayed in a sequence. Surprisingly the more frames that where skipped the better the perceived depth became. This is somewhat in contrast with normal 2D video where smooth trickplay—whereby the decoder decodes all the frames faster—is perceived as being better. This can be explained by taking into account the fact that it takes time for the optical system to fuse the two images from the eyes into one stereoscopic image (through accommodation and convergence) and generate a "3D" mental image. In normal life this is not a problem as depth perception relies on many factors and binocular disparity (stereopsis) is only effective for objects that are close to the viewer. For fast moving objects motion parallax plays a bigger role than occlusion. In a 3D display this however is a problem as the 3D effect relies mainly on binocular disparity so for fast moving objects the depth perception is diminished.

To solve the above problem for trickplay it is necessary to define the entry points for the sequence of selected fragments that are to be reproduced in the respective trickplay mode, as described above.

In an embodiment the Entry Point table of Blu-ray Disc is extended to accommodate the additionally defined entry points. This table now lists entry points for the video and provides the link between the time-positions in the video and the positions in the file on disc. The extension is such that in addition to an entry for the 2D video stream, the table now also lists the entry points for the second, auxiliary video stream, which is encoded using scalable video coding and is dependent on the primary video stream for decoding. This second entry establishes an association from every entry in the first stream to the corresponding entry point in the second stream. This last may contain an I or a P frame, where the P frame may in turn reference the I frame from the primary stream. This approach is taken as when using the direct Presentation Time Stamps (PTS) values. Note that a separate EP map for the second stream may not work on its own as the auxiliary stream is only dependently decodable, e.g. may contain only P or B frames at the same PTS times. As such the auxiliary stream is not a valid stream when decoded on its own. For example for multiview encoded video in Blu-ray Disc the entry point table may be extended and the way the Blu-ray player uses the EP-map is adapted to retrieve both the main entry points and the auxiliary entry points. The specification is enhanced such that the EP map related to the base view video stream also contains the entry points for the associated auxiliary streams, which by themselves cannot be decoded.

The references [1] and [2] describe the principles behind jointly coded video streams and the associated transport format. For example, before encoding, the 3D views are interleaved and then coded using hierarchical B frames. Before transport the bitstream is split into a primary stream and an auxiliary stream. This is done for backwards compatibility such that a 2D decoder can decode and use the primary stream and ignore the auxiliary stream. In a modified decoder the primary and auxiliary stream are interleaved again and decoded. This creates a problem for trickplay on Blu-ray disc whereby the primary and auxiliary stream are stored separately on disc. To solve this it is required that the EP map table is extended such that the player knows which clips, i.e. part of the streams, of the primary and auxiliary stream must be interleaved and decoded for display of the section of the video that the player has skipped to. By the enhanced entry point table as proposed, this problem is solved.

Figure 4:
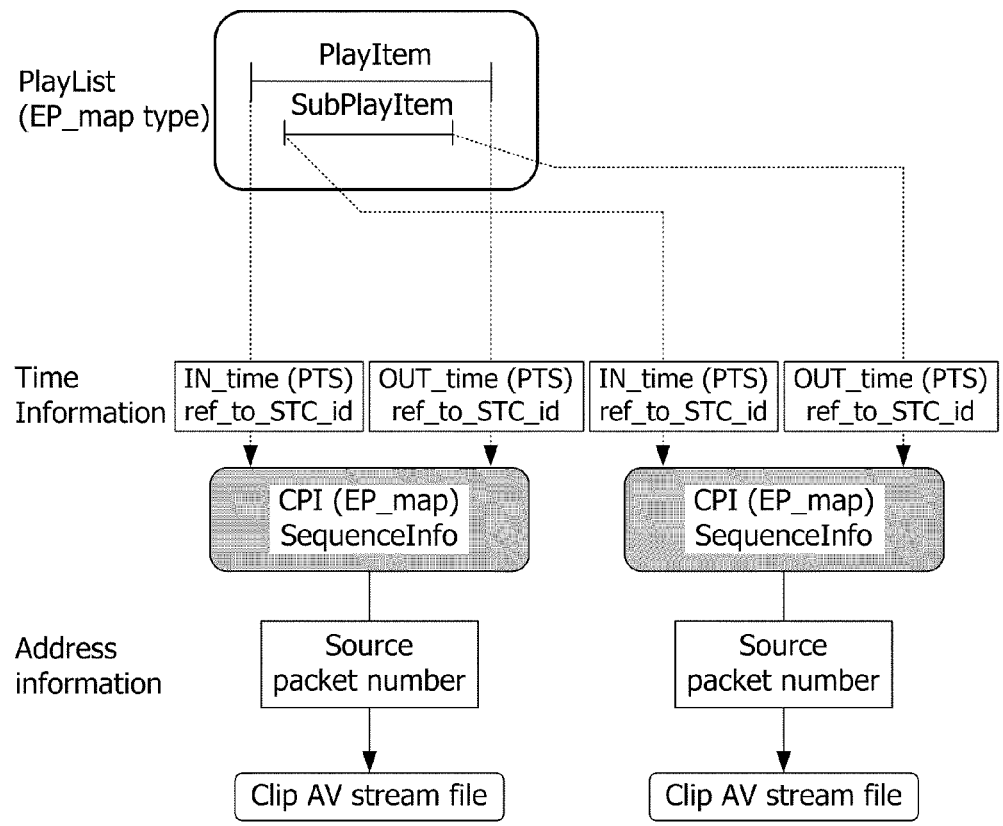
FIG. 4 shows a basic structure of a playlist.

FIG. 4 shows a basic structure of a playlist. The example is based on BD and the role that the EP-map 41 (entry point table in the control information CPI) takes in this structure. For a certain PTS value the EP-map provides a logical address, e.g. the corresponding source packet number in the clip AV stream file which is an MPEG encoded elementary stream. The structure is further described with reference to FIGS. 6 to 11.

Figure 5:
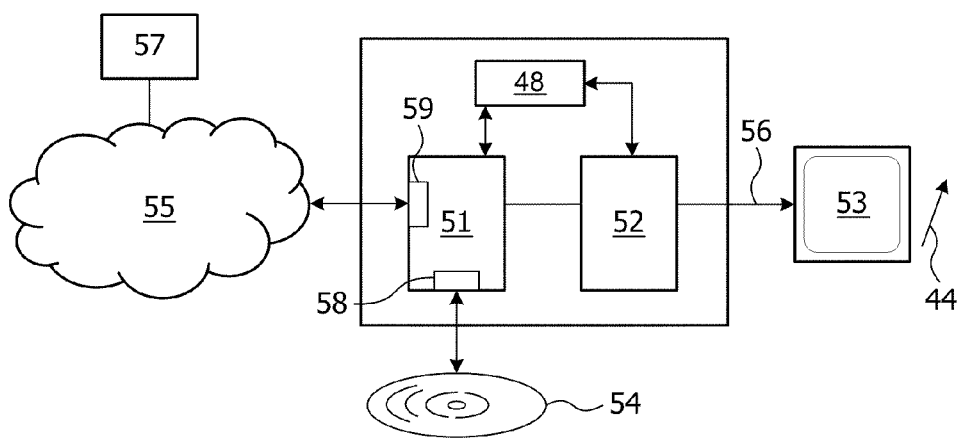
FIG. 5 shows a system for displaying three dimensional (3D) video data.

FIG. 5 shows a system for displaying three dimensional (3D) video data. A 3D source device 50, e.g. a disc player, is coupled to a 3D display device 53 for transferring a 3D display signal 56. The 3D source device has an input unit 51 for receiving image information. For example the input unit device may include an optical disc unit 58 for retrieving various types of image information from an optical record carrier 54 like a DVD or BluRay disc. Alternatively, the input unit may include a network interface unit 59 for coupling to a network 55, for example the internet or a broadcast network, such device usually being called a set-top box. Image data may be retrieved from a remote media server 57. The source device may also be a satellite receiver, or a media server directly providing the display signals, i.e. any suitable device that outputs a 3D display signal to be directly coupled to a display unit.

The 3D display device 53 is for displaying 3D image data. The device has an input interface unit for receiving the 3D display signal 56 including the 3D image data transferred from the source device 10. The device has a 3D display for displaying the processed image data, for example a dual or lenticular LCD. The display device 53 may be any type of stereoscopic display, also called 3D display, and has a display depth range indicated by arrow 44.

The 3D source device 50 has an image processing unit 52 coupled to the input unit 51 for processing the image information for generating a 3D display signal 56 to be transferred via an output interface unit 12 to the display device. The processing unit 52 is arranged for generating the image data included in the 3D display signal 56 for display on the display device 13. The source device is provided with user control elements, for controlling display parameters of the image data, such as contrast or color parameter. The user control elements as such are well known, and may include a remote control unit having various buttons and/or cursor control functions to control the various functions of the 3D source device, such as normal playback and recording functions, and for selecting trickplay modes, e.g. via direct buttons, or via a graphical user interface and/or menus.

The source device 50 has a trickplay processing unit 48 for processing the 3D video data in trickplay mode. The 3D video data is reproduced during trickplay by, according to the entry point table, retrieving and decoding non-adjacent fragments of the 2D sub-stream and retrieving and dependently decoding corresponding fragments of the auxiliary sub-stream. The 2D sub-stream is independently decoded for the respective fragment, and the 3D information is added based on the corresponding fragment of the auxiliary stream as retrieved from the video data stream based on the auxiliary entry point.

FIG. 5 further shows the record carrier 54 as a carrier of the 3D image data. The record carrier is disc-shaped and has a track and a central hole. The track, constituted by a series of physically detectable marks, is arranged in accordance with a spiral or concentric pattern of turns constituting substantially parallel tracks on an information layer. The record carrier may be optically readable, called an optical disc, e.g. a CD, DVD or BD (Blue-ray Disc). The information is represented on the information layer by the optically detectable marks along the track, e.g. pits and lands. The track structure also comprises position information, e.g. headers and addresses, for indication the location of units of information, usually called information blocks. The record carrier 54 carries information representing digitally encoded 3D video data, for example encoded according to the MPEG2 or MPEG4 encoding system, in a predefined recording format like the DVD or BD format.

Described below is the relevant part of the syntax of an EP-map table based on the Blu-ray Disc specification. We propose to extend this table such that it may contain also the entries of the associated streams which are dependent for decoding on the main stream listed in the top of the EP-map table.

In practice this will mean that for every auxiliary stream that is jointly coded with another stream there is an EP_map in the same table as the stream that it is dependent on for being decoded. The reverse, i.e. an additional table for the auxiliary stream, is also possible and is more efficient in case of backwards compatibility with 2D decoding. In this case there is an EP-map for the clips containing the auxiliary streams. In this EP-map there are also the entry point locations for the part of the base view stream of which the entry point in the auxiliary stream is dependent on for decoding. In case of playback of multiview encoded video the player then only needs to load the EP-map of the auxiliary stream and then has the access points for the base view stream which must be decoded to be able to decode the frame at the access point of the auxiliary stream.

In detail a new EP_map is proposed that contains a mapping of entry points to file location for a multiple stream encoded 3D video stream. The Blu-ray Disc specification currently defines only one type of EP_map this is indicated in a table in the specification as shown below.

Figures 6, 7, 8, 9:
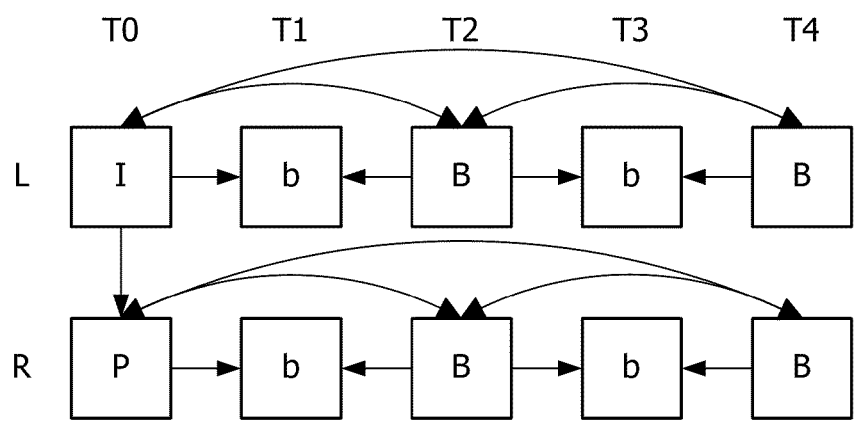
FIG. 6 shows an entry point table indicator table.
FIG. 7 shows an enhanced entry point table indicator table.
FIG. 8 shows an enhanced stream type table.
FIG. 9 shows a 3D video stream having two sub-streams.

FIG. 6 shows an entry point table indicator table. The table shows existing EP map types. The indicator values for indicating the EP map type may be defined in a standard describing a recording format, e.g. Blu-ray disc. It is proposed to add a new type for multiview coded (MVC) 3D video in this table called the "EP_map_MVC or some similar naming like EP_map_ST for stereoscopic 3D video. This EP_MVC_map type may be indicated by the value 2.

FIG. 7 shows an enhanced entry point table indicator table. The table shows existing EP map types and the proposed new type for MVC 3D video in this table called the "EP_map_MVC. In an embodiment the respective EP map type is included in the EP map data structure when generating the 3D video data stream, and transferred to a playback device. The playback device can now easily detect the new EP map table type, and adapt the trickplay operation to the respective EP map.

FIG. 8 shows an enhanced stream type table. Alternatively to FIGS. 6,7 the new EP-map is now indicated using the EP_stream_type value as shown in the table with a new value (8 in the table) for the type of stream referenced in the EP_map. In an embodiment the respective EP stream type is included in the sD video stream data structure when generating the 3D video data stream, and transferred to a playback device. The playback device can now easily detect the new EP stream type and retrieve the enhanced entry point table from the stream, and adapt the trickplay operation to the enhanced entry point table.

FIG. 9 shows a 3D video stream having two sub-streams. The figure shows an example of MVC encoding of a section of two streams using hierarchical B-pictures. The upper sequence marked L is an independently decodable 2D sub-stream, while the lower sequence marked R is dependently decodable, because it requires data from the first stream. An arrow indicates that data from the first I picture is used for encoding the first P picture of the lower substream.

In the example as shown in FIG. 9 there are three entry points in both the L and R stream. In the L stream there is an I, B(T2) and B(T4) picture and in the R stream there is a P, B(T2) and B(T4) picture. The B-pictures in between are non reference frames and cannot serve as entry-point. It is noted that, in practice, the distance between entry points will be substantially larger.

We will now continue by investigating what happens if the user wants to jump to the location T2. If decoding starts in T2 then the decoder must also have access to the I picture in T0 for the L stream and for the R stream it must have access to the I-picture from the L stream and the P-picture from the R stream. So it requires the location of the I-picture in the L stream and the location of the P-picture in the R stream. So it requires a temporal vector to the location of the P-picture and a spatial vector to the I-picture of the L frame.

On the disc the L and R stream each may be interleaved in different sections on the disc or may be contained in one stream. Therefore both a location in the file and a location on the disc may be needed for one entry-point, as for one entry point information from both the L and R stream is required as explained above. Hence a main entry point in the sub-stream L and an auxiliary entry point in the dependently decodable substream R are to be provided.

Therefore in detail we propose to extend the EP map for MVC encoded video such that each entry point contains two addresses, also called vectors. One temporal vector points to the PTS and one spatial vector points to a packet number of frames that serve as reference frame to the entry point.

FIG. 10 shows a definition of an entry point map, also called EP_map syntax. The table shows an example of the current EP-map extended for use with MVC encoded video. The map comprises sub-tables for respective sub-streams. It is noted that the table defines the data structure of the entry point table which is included with the 3D video data stream, e.g. in the control information on a record carrier such control information CPI 41 in the Blu-ray disc format.

FIG. 11 shows an entry point table for a combined main stream and a sub-stream, also called an EP_map for one stream PID. In this embodiment no specific MVC section is added as shown in FIG. 10, but the table is extended with additional entries such that each entry point also indicates the list of packet numbers and PTS values in the dependent data streams.

In an embodiment of a playback system for multi-view encoded 3D video trickplay is arranged as follows. The 3D video stream has multiple auxiliary sub-streams and the entry points comprise auxiliary entry points only for a selected subset of said multiple auxiliary sub-streams. During trickplay a reduced version of the 3D video data is rendered by only decoding the sub-streams having the entry points. Advantageously the size of the entry point table remains limited.

Alternatively the decoder automatically reduces the number of views when performing trickplay to reduce the burden on the decoder. The number of views can be reduced dynamically in steps for increasing speeds, e.g. 9-7-5-3-2. The respective entry points for the reduced number of views may be retrieved from an entry point table. Alternatively a reduced number of views may be generated during trickplay in a processing unit which produces said full multitude of views during standard speed playback.

It is to be noted that the invention may be implemented in hardware and/or software, using programmable components. A method for implementing the invention has the processing steps corresponding to the processing of 3D video data elucidated with reference to FIG. 1. Although the invention has been mainly explained by embodiments using optical record carriers or the internet, the invention is also suitable for any image interfacing environment, like a 3D personal computer [PC] display interface, or 3D media center PC coupled to a wireless 3D display device.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and lies in each and every novel feature or combination of features described above.

Reference [1]: "A novel Milti-View Video Coding Scheme Based on H.264; by GuopingLi, Yun He; ICICS-PCM 2003, 15-18 Dec. 2003, Singapore, IEEE 0-7893-8185-8/03/$17.00"

Reference [2]: "Efficient Prediction Structures for Multi-View Video Coding; by Philipp Merkle et al; IEEE 2007"

Reference [3]: "Depth image based rendering, compression and transmission for a new approach on 3D TV" by Christoph Fehn (see http://iphome.hhi.de/fehn/Publications/fehn_EI2004.pdf)

The invention claimed is:

1. Method of providing entry points for a video data stream, the method comprising,
   generating an entry point table;
   defining entry points in the video data stream, in which the entry points are defined at a distance in time from each other for enabling trickplay;
   storing the defined entry points in the entry point table by storing entry point addresses giving the location of the defined entry points,
   wherein
   the video data stream comprises a multitude of sub-streams, which multitude represents one stream of 3D video data and comprises at least one 2D sub-stream that comprises an independently encoded 2D version of the 3D video data and at least one auxiliary sub-stream that comprises a dependently encoded part of the 3D video data;
   defining the entry points comprises associating the entry point table with the 3D video data by defining main entry points in the 2D sub-stream and auxiliary entry points in the auxiliary sub-stream for enabling 3D trickplay of the 3D video data by retrieving and decoding non-adjacent fragments of the 2D sub-stream and retrieving and dependently decoding corresponding fragments of the auxiliary sub-stream based on retrieving the main entry points and the auxiliary entry points.

2. Method as claimed in claim 1,
   wherein the video data stream comprises
   multi-view 3D video data, which multi-view includes at least one left view and one right view; or wherein the at least one auxiliary sub-stream comprises at least one of a depth information data stream; a transparency information data stream; an occlusion information data stream; or wherein the video data stream comprises multiple auxiliary sub-streams and the entry points comprise auxiliary entry points only for a selected subset of said multiple auxiliary sub-streams for rendering a reduced version of the 3D video data during trickplay.

3. Method as claimed in claim 1, wherein the method comprises the steps of:
   generating a first entry point sub-table, associated with the 2D sub-stream, and
   generating a second entry point sub-table, associated with the auxiliary sub-stream, and
   forming the entry point table associated with the 3D video data by the first entry point sub-table and the second entry point sub-table.

4. Method as claimed in claim 1, wherein the method comprises the step of:
   defining, for each entry point, a set of multiple entry point addresses, which include at least a first entry point address to a main entry point and at least a second entry point address to a corresponding auxiliary entry point address.

5. Method as claimed in claim 1, wherein associating the entry point table comprises establishing an association from respective main entry points to corresponding auxiliary entry points using the same presentation time stamp (PTS) values.

6. Method as claimed in claim 1, wherein associating the entry point table comprises providing the auxiliary entry points in a separate entry point map for the auxiliary sub-stream.

7. Method as claimed in claim 1, wherein the rendering 3D trickplay comprises retrieving, for respective main entry points, corresponding auxiliary entry points using the same presentation time stamp (PTS) values.

8. Method as claimed in claim 1, wherein the rendering 3D trickplay comprises retrieving the auxiliary entry points from a separate entry point map for the auxiliary sub-stream.

9. Method as claimed in claim 1, wherein the method comprises retrieving
   the main entry points from a first entry point sub-table associated with the 2D sub-stream, and
   the auxiliary entry points from a second entry point sub-table associated with the auxiliary sub-stream.

10. Device for providing entry points for a video data stream, the apparatus comprising:
    means (18) for generating an entry point table by
    defining entry points in the video data stream, in which the entry points are defined at a distance in time from each other for enabling trickplay, and
    storing the defined entry points in the entry point table by storing entry point addresses giving the location of the defined entry points, wherein
the video data stream comprises a multitude of sub-streams, which multitude represents one stream of 3D video data and comprises at least one 2D sub-stream that comprises an independently encoded 2D version of the 3D video data and at least one auxiliary sub-stream that comprises a dependently encoded part of the 3D video data, and the means (18) for generating an entry point table are arranged for associating the entry point table with the 3D video data by defining main entry points in the 2D sub-stream and auxiliary entry points in the auxiliary sub-stream for enabling 3D trickplay of the 3D video data by retrieving and decoding non-adjacent fragments of the 2D sub-stream and retrieving and dependently decoding corresponding fragments of the auxiliary sub-stream based on retrieving the main entry points and the auxiliary entry points.

11. Device claimed in claim 10, wherein the device comprises writing means for storing the video data stream and the entry point table on a record carrier.

12. Device for reproducing video data, the apparatus comprising
means (58,59) for receiving a video data stream and an entry point table as defined in claim 1, wherein
the video data stream comprises a multitude of sub-streams, which multitude represents one stream of 3D video data and comprises at least one 2D sub-stream that comprises an independently encoded 2D version of the 3D video data and at least one auxiliary sub-stream that comprises a dependently encoded part of the 3D video data; and—the device comprises means (48) for 3D trickplay of the 3D video data by reproducing the 3D video data by retrieving and decoding non-adjacent fragments of the 2D sub-stream and retrieving and dependently decoding corresponding fragments of the auxiliary sub-stream based on retrieving main entry points in the 2D sub-stream and auxiliary entry points in the auxiliary sub-stream.

13. Device claimed in claim 12, wherein the device comprises reading means (58) for reading the video data stream and the entry point table from a record carrier.

14. Device as claimed in claim 12, wherein the means (48) for 3D trickplay are arranged for retrieving, for respective main entry points, corresponding auxiliary entry points using the same presentation time stamp (PTS) values.

15. Device as claimed in claim 12, wherein the means (48) for 3D trickplay are arranged for retrieving the auxiliary entry points from a separate entry point map for the auxiliary sub-stream.

16. Device claimed in claim 12, wherein the means (48) for 3D trickplay are arranged for retrieving the main entry points from a first entry point sub-table associated with the 2D sub-stream, and the auxiliary entry points from a second entry point sub-table associated with the auxiliary sub-stream.

17. Computer-readable, non-transitory medium having stored therein instructions for causing a processing unit to execute a method of providing entry points for a video data stream, the medium comprising code for:
generating an entry point table;
defining entry points in the video data stream, in which the entry points are defined at a distance in time from each other for enabling trickplay;
storing the defined entry points in the entry point table by storing entry point addresses giving the location of the defined entry points,
wherein
the video data stream comprises a multitude of sub-streams, which multitude represents one stream of 3D video data and comprises at least one 2D sub-stream that comprises an independently encoded 2D version of the 3D video data and at least one auxiliary sub-stream that comprises a dependently encoded part of the 3D video data;
defining the entry points comprises associating the entry point table with the 3D video data by defining main entry points in the 2D sub-stream and auxiliary entry points in the auxiliary sub-stream for enabling 3D trickplay of the 3D video data by retrieving and decoding non-adjacent fragments of the 2D sub-stream and retrieving and dependently decoding corresponding fragments of the auxiliary sub-stream based on retrieving the main entry points and the auxiliary entry points.

* * * * *